United States Patent
Lin

(10) Patent No.: US 10,597,789 B2
(45) Date of Patent: Mar. 24, 2020

(54) OXYHYDROGEN GAS SUPPLY EQUIPMENT

(71) Applicant: EPOCH ENERGY TECHNOLOGY CORP., Kaohsiung (TW)

(72) Inventor: Wen-Chang Lin, Kaohsiung (TW)

(73) Assignee: EPOCH ENERGY TECHNOLOGY CORP., Kaohsiung (TW)

( * ) Notice: Subject to any disclaimer, the term of this patent is extended or adjusted under 35 U.S.C. 154(b) by 0 days.

(21) Appl. No.: 16/128,627

(22) Filed: Sep. 12, 2018

(65) Prior Publication Data
US 2020/0017982 A1    Jan. 16, 2020

(30) Foreign Application Priority Data
Jul. 11, 2018   (TW) .............................. 107123934 A

(51) Int. Cl.
| | |
|---|---|
| C25B 15/08 | (2006.01) |
| C25B 1/06 | (2006.01) |
| C25B 15/02 | (2006.01) |
| C25B 9/06 | (2006.01) |
| F02B 43/10 | (2006.01) |

(52) U.S. Cl.
CPC ............... C25B 15/08 (2013.01); C25B 1/06 (2013.01); C25B 9/06 (2013.01); C25B 15/02 (2013.01); F02B 43/10 (2013.01); *F02B 2043/106* (2013.01)

(58) Field of Classification Search
CPC .... C25B 1/02–1/12; C25B 9/06; C25B 15/02; C25B 15/08; F02B 43/10; F02B 2043/106
See application file for complete search history.

(56) References Cited

U.S. PATENT DOCUMENTS

| | | | |
|---|---|---|---|
| 2004/0149591 A1* | 8/2004 | Klein | ........................ B01J 4/00 205/628 |
| 2015/0226113 A1* | 8/2015 | Alexander | .......... F02D 41/0027 123/3 |
| 2015/0308333 A1* | 10/2015 | Chen | ...................... F02B 43/10 123/3 |

* cited by examiner

*Primary Examiner* — Ciel P Thomas
(74) *Attorney, Agent, or Firm* — Dykema Gossett

(57) ABSTRACT

An oxyhydrogen gas supply equipment includes a gas supply unit, an allocating unit and a mixing unit. The gas supply unit includes an electrolysis device, and an oxygen gas delivery pipeline and a hydrogen gas delivery pipeline that are connected to the electrolysis device. The allocating unit includes a buffer tank connected to the oxygen gas delivery pipeline, and a throttle valve connected to the buffer tank and operable to regulate oxygen gas output therefrom. The mixing unit includes a mixing tank connected to the hydrogen gas delivery pipeline and throttle valve, an output pipeline connected to the mixing tank, and a detector for detecting oxygen gas content inside the mixing tank to regulate the oxygen gas output from the throttle valve.

5 Claims, 2 Drawing Sheets

OXYHYDROGEN GAS SUPPLY EQUIPMENT

CROSS-REFERENCE TO RELATED APPLICATION

This application claims priority of Taiwanese Invention Patent Application No. 107123934, filed on Jul. 11, 2018.

FIELD

The disclosure relates to an oxyhydrogen gas supply equipment, and more particularly to an oxyhydrogen gas supply equipment that is capable of adjusting the mixing ratio of hydrogen gas and oxygen gas.

BACKGROUND

An oxyhydrogen gas, i.e., a mixture of hydrogen gas and oxygen gas that is generally produced by electrolysis, has numerous industrial applications. For example, the oxyhydrogen gas can be utilized as a fuel of internal combustion engines for powering vehicles and electrical devices, a cleaner for carbon removal, or a supplement in human healthcare. Referring to FIG. 1, a conventional oxyhydrogen gas generating device 100 includes an electrolytic cell 102 with an electrolyte solution 101, a plurality of electrode plates 103 immersed in the electrolyte solution 101, a power supply 104 connected to the electrode plates 103 for supplying electricity, and an output pipeline 105 connected to the electrolytic cell 102. By applying electricity to the electrode plates 103 through the power supply 104, the electrolyte solution 101 in the electrolytic cell 102 is subjected to electrolysis to generate hydrogen gas and oxygen gas. The thus mixed oxyhydrogen gas in the electrolytic cell 102 is then delivered to outside through the output pipeline 105 for the aforementioned various purposes. However, the optimal ratio of the hydrogen gas and the oxygen gas varies depending on the intended purposes. The ratio of hydrogen gas and oxygen gas produced by the conventional oxyhydrogen gas generating device 100 through electrolysis is fixed. Therefore, there is still a need in the art to provide an oxyhydrogen gas generating device for generating oxyhydrogen gas with an adjustable ratio of hydrogen gas and oxygen gas.

SUMMARY

Therefore, an object of the disclosure is to provide an oxyhydrogen gas supply equipment that can alleviate at least one of the drawbacks of the prior art.

According to the disclosure, an oxyhydrogen gas supply equipment includes a gas supply unit, an allocating unit, and a mixing unit. The gas supply unit includes an electrolysis device that is capable of generating hydrogen gas and oxygen gas through electrolysis, and an oxygen gas delivery pipeline and a hydrogen gas delivery pipeline that are connected to the electrolysis device. The allocating unit includes a buffer tank that is connected to the oxygen gas supply pipeline of the gas supply unit, and a throttle valve that is connected to the buffer tank and that is operable to regulate output of the oxygen gas from the buffer tank. The mixing unit includes a mixing tank that is connected to the hydrogen gas delivery pipeline of the gas supply unit and the throttle valve of the allocating unit and that is adapted for mixing the hydrogen gas from the hydrogen gas delivery pipeline and the oxygen gas from the throttle valve to form oxyhydrogen gas, an output pipeline that is connected to the mixing tank and that is operable to discharge the oxyhydrogen gas, and a detector for detecting oxygen gas content of the oxyhydrogen gas inside the mixing tank to regulate the output of the oxygen gas from the throttle valve.

BRIEF DESCRIPTION OF THE DRAWINGS

Other features and advantages of the disclosure will become apparent in the following detailed description of the embodiment (s) with reference to the accompanying drawings, of which.

DETAILED DESCRIPTION

Figure 1:
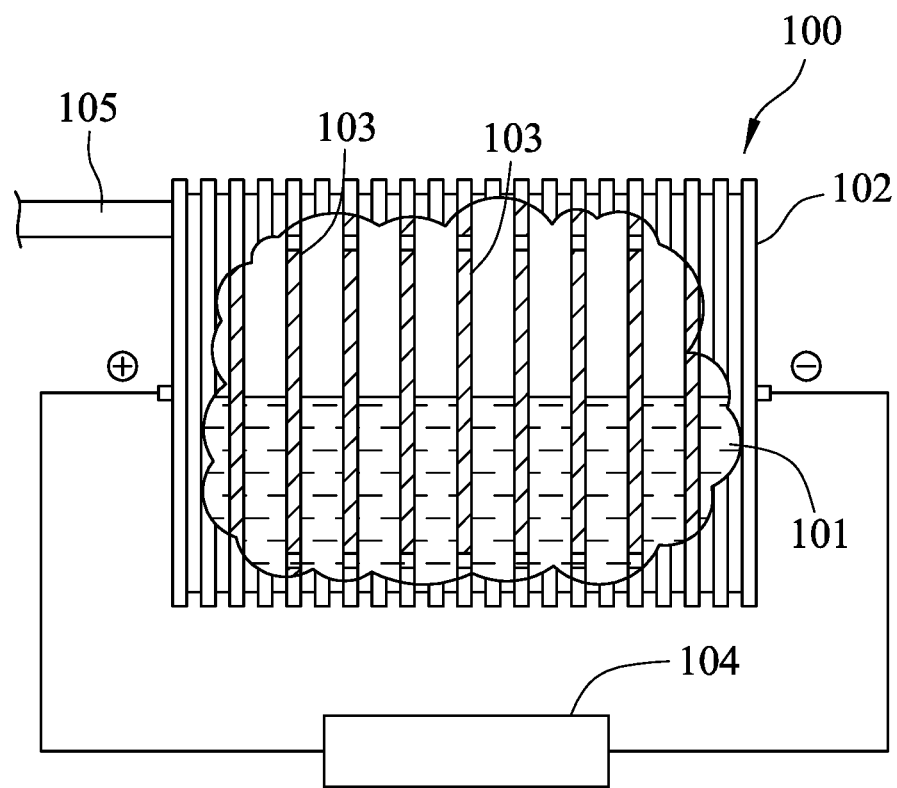
FIG. 1 is schematic view illustrating a conventional oxyhydrogen gas generating device.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
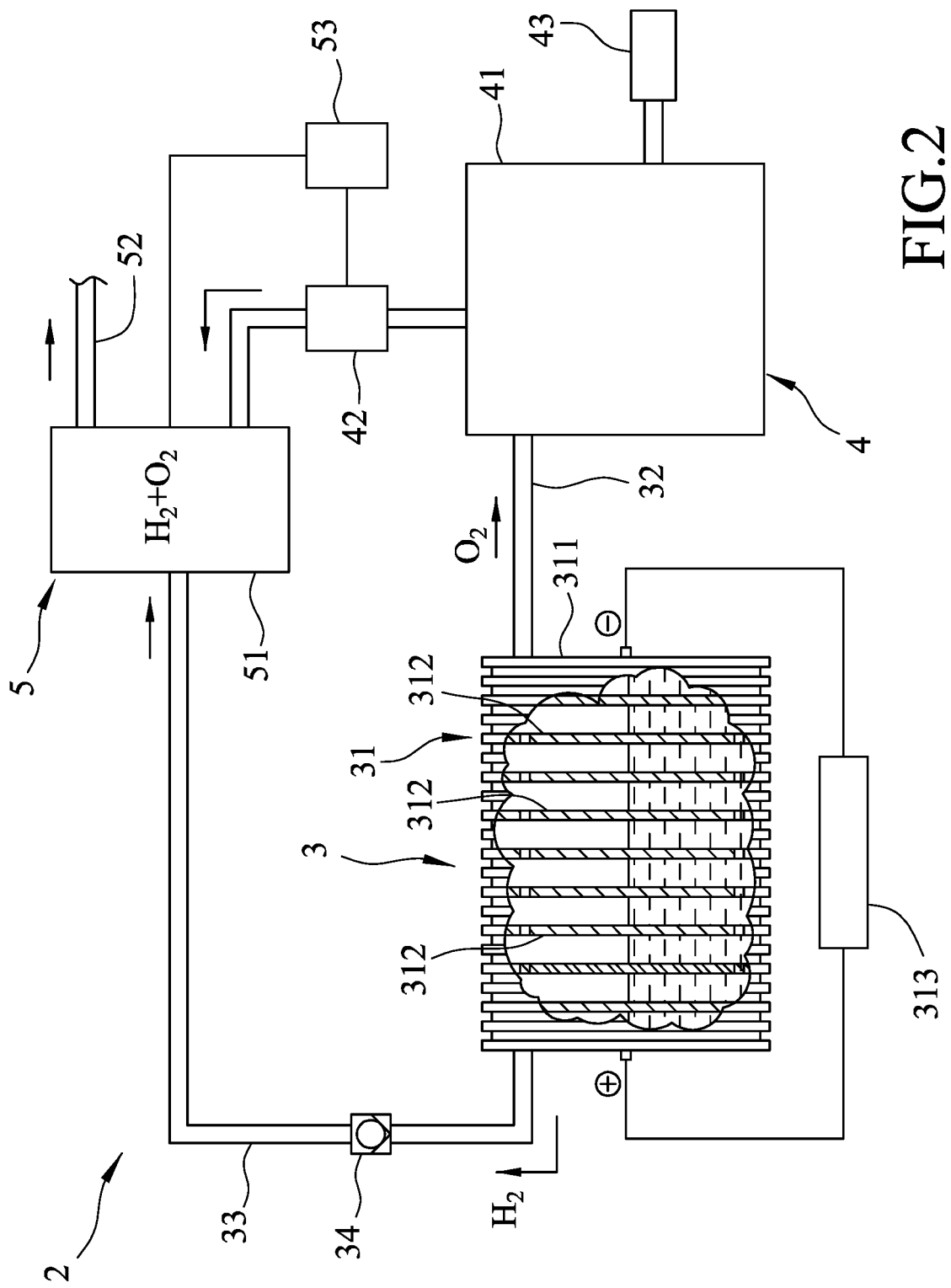
FIG. 2 is a schematic view illustrating an embodiment of an oxyhydrogen gas supply equipment of this disclosure.

Referring to FIG. 2, an embodiment of an oxyhydrogen gas supply equipment 2 of this disclosure includes a gas supply unit 3, an allocating unit 4 that is connected to the gas supply unit 3, and a mixing unit 5 that is connected the gas supply unit 3 and the allocating unit 4.

The gas supply unit 3 includes an electrolysis device 31, an oxygen gas delivery pipeline 32 and a hydrogen gas delivery pipeline 33 that are connected to the electrolysis device 31, and a reflux preventing valve 34 that is disposed between the electrolysis device 31 and the hydrogen gas delivery pipeline 33. The electrolysis device 31 includes an electrolytic cell 311 for receiving an electrolyte solution (such as water), a plurality of electrode plates 312 that are immersed in the electrolyte solution, and a power supply 313 that is electrically connected to the electrode plates 312 and is operable to supply electricity. The electrode plates 312 are charged by the power supply 313 to generate the hydrogen gas and the oxygen gas through electrolysis of the electrolyte solution. In this embodiment, the reflux preventing valve 34 is a water-sealed reflux preventing valve, but is not limited thereto.

The allocating unit 4 includes a buffer tank 41 that is connected to the oxygen gas delivery pipeline 32 of the gas supply unit 3, a throttle valve 42 that is connected to the buffer tank 41 and that is operable to regulate output of the oxygen gas from the buffer tank 41, and a pressure relief valve 43 that is connected to the buffer tank 41. The pressure relief valve 43 may be adapted for discharging excess oxygen gas from the buffer tank 41 to outside for adjusting gas pressure inside the buffer tank 41. In addition, the pressure relief valve 43 may be capable of detecting the gas pressure inside the buffer tank 41. In this embodiment, the throttle valve 42 has a needle valve structure, but is not limited thereto.

The mixing unit 5 includes a mixing tank 51 that is connected to the hydrogen gas supply pipeline 33 of the gas supply unit 3 and the throttle valve 42 of the allocation unit 4 and that is adapted for mixing the hydrogen gas from the hydrogen gas supply pipeline 33 and the oxygen gas from the throttle valve 42 to form oxyhydrogen gas. The mixing unit 5 further includes an output pipeline 52 that is connected to the mixing tank 51 for discharging the oxyhydrogen gas to the outside, and a detector 53 that is adapted for detecting oxygen gas content of the oxyhydrogen gas inside the mixing tank 51 to regulate the output of the oxygen gas from the throttle valve 42.

When the power supply 313 is turned on to apply electricity to the electrode plates 312, the electrolyte solution in the electrolytic cell 311 is subjected to electrolysis to generate hydrogen gas and oxygen gas in a fixed ratio. The thus obtained hydrogen gas and oxygen gas are respectively delivered to the hydrogen gas delivery pipeline 33 and the oxygen gas delivery pipeline 32. In this embodiment, the hydrogen gas delivery pipeline 33 and the oxygen gas supply pipeline 32 are connected to the electrolytic cell 311 at different heights. Since the hydrogen gas and the oxygen gas having respective specific gravity may become stratified, the hydrogen and oxygen gases at different layers in the electrolytic cell 311 would respectively be delivered to the corresponding hydrogen gas delivery pipeline 33 and oxygen gas delivery pipeline 32. It should be noted that other devices or structural designs may also be applied to respectively deliver these gases to the corresponding delivery pipelines. The hydrogen gas entering the hydrogen gas delivery pipeline 33 would entirely be delivered to the mixing tank 51, while the oxygen gas entering the oxygen gas supply pipeline 32 would be first delivered to the buffer tank 41 before being delivered to the mixing tank 51. In this embodiment, the throttle valve 42 regulates an appropriate amount of the oxygen gas to be delivered from the buffer tank 41 to the mixing tank 51. In the mixing tank 51, the hydrogen gas and the oxygen gas are mixed in a given ratio to form a desired oxyhydrogen gas that is then discharged from the output pipeline 52 for usage. During the discharging process, the detector 53 detects the oxygen gas content (i.e., the ratio of oxygen gas to hydrogen gas) inside the mixing tank 51 to instantly regulate the output of the oxygen gas from the throttle valve 42. The reflux preventing valve 34 is used for preventing reflux of the hydrogen gas into the electrolytic cell 311, which otherwise might cause burning and explosion. The pressure relief valve 43 is capable of detecting the gas pressure inside the buffer tank 41 and allowing excessive oxygen gas to be directly discharged from the buffer tank 41 to the outside when the detected gas pressure is too high, and thus preventing the buffer tank 41 from bursting due to the excessive gas pressure.

By virtue of the throttle valve 42 to control the amount of the oxygen gas to be delivered into the mixing tank 51, the appropriate amount of the oxygen gas to be delivered to the mixing tank 51 can be regulated, thereby obtaining an oxyhydrogen gas with a variable ratio of hydrogen and oxygen gases that may be optimized for different use. For example, in the oxyhydrogen inhaled into and absorbed by human body for healthcare purposes, the hydrogen gas thereof is preferably ranging from 75% to 79% and the oxygen gas thereof is preferably ranging from 25% to 21%. In addition, when the ratio of the hydrogen gas to the oxygen gas is regulated to be 8:1 (or other suitable ratios), refluxing may be avoided, thereby improving operational safety. Moreover, when the oxygen gas is not delivered to the mixing tank 51, the gas discharged from the mixing tank 51 (i.e., 100% hydrogen gas) can be used for supporting combustion or for air purification. The ratio of the hydrogen gas to the oxygen gas may also be adjusted according to actual requirements to achieve optimal performance in, such as, industrial welding, sterilization or other purposes.

In summary, since the throttle valve 42 of the oxyhydrogen gas supply equipment 2 of this disclosure can regulate an appropriate amount of oxygen gas to be delivered from the buffer tank 41 to the mixing tank 51, the ratio of the hydrogen gas to the oxygen gas of the thus obtained oxyhydrogen gas can be adjusted to meet different and/or specialized uses.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. An oxyhydrogen gas supply equipment, comprising:
    a gas supply unit including
        an electrolysis device that is capable of generating hydrogen gas and oxygen gas through electrolysis, and
        an oxygen gas delivery pipeline and a hydrogen gas delivery pipeline that are connected to said electrolysis device;
    an allocating unit including
        a buffer tank that is connected to said oxygen gas delivery pipeline of said gas supply unit, and
        a throttle valve that is connected to said buffer tank and that is operable to regulate output of the oxygen gas from said buffer tank; and
    a mixing unit including
        a mixing tank that is directly connected to said hydrogen gas delivery pipeline of said gas supply unit and said throttle valve of said allocating unit and that is adapted for mixing the hydrogen gas from said hydrogen gas delivery pipeline and the oxygen gas from said throttle valve to form oxyhydrogen gas,
        an output pipeline that is connected to said mixing tank and that is operable to discharge the oxyhydrogen gas from said mixing tank to outside, and
        a detector for detecting oxygen gas content of the oxyhydrogen gas inside said mixing tank to regulate the output of the oxygen gas from said throttle valve.

2. The oxyhydrogen gas supply equipment as claimed in claim 1, wherein said allocating unit further includes a pressure relief valve that is connected to said buffer tank, and that is capable of discharging excessive oxygen gas from said buffer tank to outside to adjust gas pressure inside said buffer tank.

3. The oxyhydrogen gas supply equipment as claimed in claim 2, wherein said pressure relief valve is capable of detecting the gas pressure inside said buffer tank.

4. The oxyhydrogen gas supply equipment as claimed in claim 1, wherein said gas supply unit further includes a reflux preventing valve that is disposed between said hydrogen gas delivery pipeline and said electrolysis device.

5. The oxyhydrogen gas supply equipment as claimed in claim 1, wherein said electrolysis device of said gas supply unit includes an electrolytic cell for receiving an electrolyte solution, a plurality of electrode plates immersed in the electrolyte solution, and a power supply electrically connected to said electrode plates and operable to supply electricity.

\* \* \* \* \*